Nov. 14, 1939.   S. M. TUCKER   2,180,023
HUB CONSTRUCTION FOR A FILM SPOOL
Filed Jan. 21, 1937

STEPHEN M. TUCKER
INVENTOR.
BY Newton M. Perrins
George A. Gillett, Jr.
ATTORNEYS Patented Nov. 14, 1939

2,180,023

UNITED STATES PATENT OFFICE 2,180,023

HUB CONSTRUCTION FOR A FILM SPOOL

Stephen M. Tucker, Rochester, N. Y., assignor to Eastman Kodak Company, Rochester, N. Y., a corporation of New Jersey Application January 21, 1937, Serial No. 121,477

1 Claim. (Cl. 242—74)

The present invention relates to a hub construction for a photographic film spool which is suitable for encasement within a light-tight film retort for use in small cameras.

It has already been proposed to fasten the trailer end of a film strip to the spool hub by clamping the same between the interior of the hub and an inserted plug which may be of soft wood or which may be a resilient metallic member, one end of the insert being formed so as to be engaged by the winding key of the camera. However, the inserted plug should be susceptible of ready removal for detachment of the trailer end of the film strip from the spool core.

The primary object of the present invention is the provision of a hub construction in which the film strip is clamped between the hollow tube of the spool and a core therein and in which the core may be readily removed or inserted.

A further object of the invention is the provision on such an insertable core of a clutch member which facilitates insertion and rotation of the core into proper position.

To these and other ends, the invention consists of certain parts and combinations of parts, all of which will be hereinafter described; the novel features being pointed out in the appended claim.

Reference is hereby made to the accompanying drawing wherein like reference characters designate similar elements and wherein.

Figure 1:
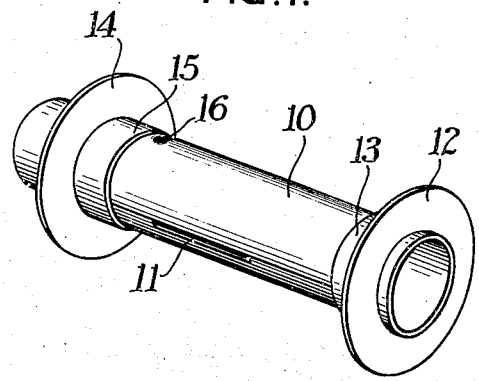
Fig. 1 is a perspective view of the film spool.
Figure 2:
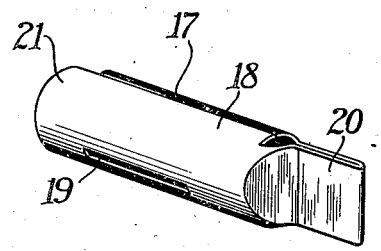
Fig. 2 is a perspective view of the insertable core.

The film spool in general is of conventional construction and comprises a hollow tube 10 which is provided with a film slot 11. A flange 12 having a collar 13 is pressed onto one end of the tube 10, while the flange 14 having a collar 15 is pressed onto the other end of tube 10 but is spaced from that end of the tube 10 a distance greater than the flange 12 is spaced from the other end of the tube. A projection 16 extends into the interior of hollow tube 10 and may comprise an embossing formed in the thin sheet material of said hollow tube 10.

A hollow core 17 comprises a cylindrical body portion 18 which is provided with a film slot 19. A clutch member 20 is provided at one end of the hollow core 17 and may be formed from two flat portions integral with the body portion 18. A portion or extension 21 co-operates with the projection or embossing 16 in the hollow tube 10 in a manner which will be described hereinafter and which does not in any respect hamper the removal of the core 17 from the tube 10.

Figure 3:
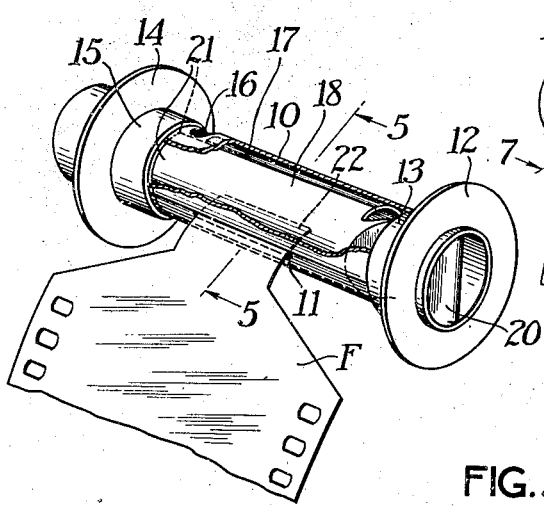
Fig. 3 is a perspective view of the assembled spool and core showing the film slots in the tube of the spool and in the core in registration to receive the end of a film strip and with a portion of the spool tube broken away for better illustration of said core.
Figure 4:
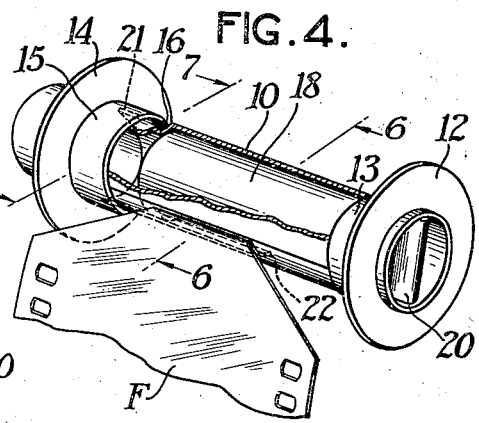
Fig. 4 is also a perspective view of the assembled spool and core after the core has been rotated to clamp the film strip, part of the spool tube being cut away to show the extension on the core abutting the embossing on the tube of the film spool.
Figures 5, 7:
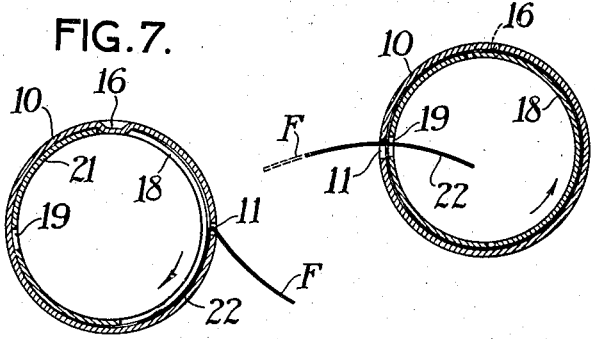
Fig. 5 is a transverse cross-section through the assembled tube and core taken on the line 5—5 of Fig. 3.
Fig. 7 is a transverse cross-section taken through one end of the spool on the line 7—7 of Fig. 4 and illustrates the abutment of the extension on the core against the embossing in the hollow tube of the film spool.

The assembly of the spool hub according to the invention will now be described. First, the hollow core 17 is inserted into the hollow tube 10 with the film slot 19 in core 17 in registry with the film slot 11 in tube 10, see Fig. 5. The clutch member 20 will be of considerable assistance in so inserting said core 17 into the tube 10. A narrowed portion 22 of the film strip F is then inserted into the film slots 11 and 19, as also shown in Fig. 5. It should be noted that with film slots 11 and 19 in registry, the portion or extension 21 of the core 17 passes beyond the projection or embossing 16, as shown in Fig. 3, and the end of body portion 18 abuts against the side of projection 16, as also shown in Fig. 3, to limit the extent of the axial insertion of the core 17.

Figure 6:
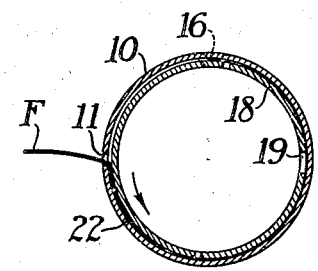
Fig. 6 is a transverse cross-section taken on the line 6—6 of Fig. 4 and showing the end of the film strip clamped between the tube and the core.

The hollow core 17 is then rotated to clamp the narrowed portion 22 of the film F between the tube and core. As shown by way of example only, such rotation of the core 17 may be counter-clockwise with respect to the tube 10 so that the narrowed portion 22 of the film is interleaved between the core 17 and tube 10, see Fig. 6. In this manner the end of the film F is frictionally clamped between core 17 and tube 10 to fasten the end of the film to the spool in the manner required for rewinding in the camera. The counter-clockwise rotation of the core 17 with respect to the tube 10 is continued until the other side of the portion or extension 21 of the core 17 abuts against the projection or embossing, see Fig. 7.

It should be remembered that the film F is coated with a light-sensitive emulsion and that all of these operations for assembly of the tube and core must be performed in a darkroom. After exposure, the film is rewound upon the hollow tube 10. Detachment of the film from the spool must also be accomplished in a darkroom and it is pre-eminently necessary that the core 17 be susceptible of ready removal. The lack of any inter-engagement between the portion or extension 21 and projection or embossing 16 permits the core 17 to be grasped at the clutch member 20 and to be axially withdrawn from the tube 10 irrespective of its relative angular position therein.

The hub construction disclosed herein is susceptible of many variations without departing from the scope of the invention so that the present illustration and description is only by way of example, the scope of the invention being defined in the claim which follows.

Having now particularly described my invention, what I desire to secure by Letters Patent of the United States and what I claim is:

In a photographic film spool, the combination with a hollow tube having a pair of spaced flanges and provided with a film slot, and a hollow core also provided with a film slot which may register with the slot in said tube and adapted frictionally to fit into said tube, and a clutch member at one end of said core for facilitating rotation of said core within said tube to clamp a film strip between said tube and core, of an embossing formed in and extending into said tube near one end thereof and located to abut only the end of said core to limit only axial insertion thereof only after said clutch member is within said tube, and an extension on and extending from the end of said core for merely abutting said projection and limiting relative rotation, but not relative axial movement, between said tube and core only when the end of said core is adjacent said projection.

STEPHEN M. TUCKER.